United States Patent [19]

Pfahler et al.

[11] Patent Number: 5,331,034
[45] Date of Patent: Jul. 19, 1994

[54] PROCESS FOR REDUCING THE DISCOLORATION OF A PLASTIC MOLDING COMPOSITION AT THE PROCESSING TEMPERATURE

[75] Inventors: Gerhard Pfahler, Augsburg; Georg Schmailzl, Gersthofen, both of Fed. Rep. of Germany

[73] Assignee: Hoechst Aktiengesellschaft, Frankfurt, Fed. Rep. of Germany

[21] Appl. No.: 791,448

[22] Filed: Nov. 13, 1991

[30] Foreign Application Priority Data

Nov. 15, 1990 [DE] Fed. Rep. of Germany ....... 4036359

[51] Int. Cl.⁵ .......................... C08K 5/05; C08K 5/06; C08K 5/13
[52] U.S. Cl. ................................ 524/386; 524/291; 524/330; 524/340; 524/343; 524/347; 524/377; 524/378; 524/388
[58] Field of Search ............... 524/291, 387, 386, 388, 524/377, 378, 330, 340, 343, 347

[56] References Cited

U.S. PATENT DOCUMENTS

| | | | |
|---|---|---|---|
| 2,394,306 | 2/1946 | Hentrich et al. | 544/210 |
| 3,622,538 | 11/1971 | Green | 524/386 |
| 4,159,261 | 6/1979 | Dieckmann | 524/420 |
| 4,374,352 | 8/1982 | Wesseler | 528/423 |
| 4,504,615 | 3/1985 | Mills | 524/387 |
| 4,675,356 | 6/1987 | Miyata | 524/413 |
| 4,963,606 | 10/1990 | Scheifstein | 524/387 |

FOREIGN PATENT DOCUMENTS 058447 8/1982 European Pat. Off. .
2129329 6/1987 Japan .

*Primary Examiner*—Paul R. Michl
*Assistant Examiner*—Tae H. Yoon
*Attorney, Agent, or Firm*—Connolly and Hutz

[57] ABSTRACT

In plastic molding compositions, in particular those based on olefin polymers, which contain phenolic stabilizers and metal ions as catalyst residues, the discoloration at the processing temperature is reduced if they contain triglycerol or ditrimethylolpropane as catalyst deactivators.

6 Claims, No Drawings

PROCESS FOR REDUCING THE DISCOLORATION OF A PLASTIC MOLDING COMPOSITION AT THE PROCESSING TEMPERATURE

DESCRIPTION

The invention relates to the use of triglycerol and ditrimethylolpropane for reducing the discoloration of plastic molding compositions which contain phenolic stabilizers and metal ions as catalyst residues and which are processed at elevated temperature.

In the preparation of a number of pollers, metal-containing catalysts, in particular those based on transition metals, are employed for the polymerization. Since the residues of these catalysts act, inter alia, as catalysts for thermooxidative or photoinduced degradation of the polymers, their amount in the polymers must be as low as possible, if only for this reason. Furthermore, the residues of these catalysts can form colored complexes with phenolic antioxidants added to the polymers; these complexes result in undesired discoloration in the polymers. In addition, the effects of antioxidants and light stabilizers may be impaired.

It is known that polyolefins can be protected against discoloration of said type if a nonionic surfactant, such as, for example, a polyglycol, polyalcohol or a product of the condensation of an alcohol with ethylene oxide (cf. GB 961,480), is added to them. However, it has been shown that said compounds are not always effective enough.

Furthermore, stabilized polyolefins are known which contain polypentaerythritols, in particular dipenta-erythritol or tripentaerythritol (cf. U.S. Pat. No. 3,337,495). Comparative experiments show that the two abovementioned polypentaerythritols have a better action than polyglycols or polyalcohols. Nevertheless, the effectiveness is still unsatisfactory.

The object was to find compounds which are even more effective than the known compounds for reducing the discoloration of plastic molding compositions.

It has been found that triglycerol and ditrimethylolpropane achieve the object.

The invention thus relates to a process for reducing the discoloration of a plastic molding composition which contains a phenolic compound as stabilizer and heavy-metal ions as catalyst residues, at the processing temperature by adding a polyhydroxyl compound, which comprises adding from 0.001 to 1% by weight, based on the polymer, of triglycerol or ditrimethylolpropane to the molding composition.

In addition the invention relates to a molding composition which contains from 0.001 to 1% by weight, based on the polymer, of triglycerol or ditrimethylolpropane.

The process according to the invention can be used for molding compositions based on the polymers listed below:

1. Polymers of mono- and diolefins, for example high-, medium- or low-density polyethylene (which may or may not be crosslinked), polypropylene, polyiso-butylene, poly-1-butene, polymethyl-1-pentene, polyisoprene or polybutadiene, and polymers of cycloolefins, such as, for example, of cyclopentene or norbornene.
2. Mixtures of the polymers mentioned under 1), for example mixtures of polypropylene with polyethylene or with polyisobutylene.
3. Copolymers of mono- and diolefins with one another or with other vinyl monomers, such as, for example, ethylene-propylene copolymers, propylene-1-butene copolymers, propylene-isobutylene copolymers, ethylene-1-butene copolymers, propylene-butadiene copolymers, isobutylene-isoprene copolymers, ethylene-alkyl acrylate copolymers, ethylene-alkyl methacrylate copolymers, ethylene-vinyl acetate copolymers or ethylene-acrylic acid copolymers, and salts thereof (ionomers), and terpolymers of ethylene with propylene and a diene, such as hexadiene, dicyclopentadiene or ethylidenenorbornene.
4. Mixtures of copolymers as in 3) with polymers as in 1) or 2).
5. Polyesters derived from dicarboxylic acids and diols and/or from hydroxycarboxylic acids or the corresponding lactones, such as, for example, polyethylene terephthalate, polybutylene terephthalate, poly-1,4-dimethylolcyclohexane terephthalate, poly(2,2-bis(4-hydroxyphenyl)propane) terephthalate, polyhydroxybenzoates, and block polyetheresters derived from polyethers containing hydroxyl end groups, dialcohols and dicarboxylic acids.
6. Polycarbonates.

Preferred polymers are polyethylene and polypropylene.

The catalyst deactivators to be used for the process according to the invention are triglycerol and ditrimethylolpropane.

Triglycerol is a substance which essentially comprises the compound

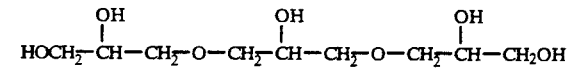

It is a white crystal slurry having a density of 1.2646 g/cm$^3$ at 40° C., a melting range of from 60° to 85° C. and a boiling point of above 250° C. at 0.2 mbar. The product is infinitely miscible with water and sparingly soluble in alcohol.

Ditrimethylolpropane is a substance essentially comprising the compound of the formula

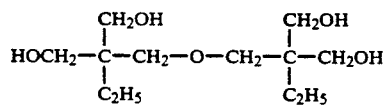

It is a white crystalline product having a melting point of about 109° C., a boiling point of about 215° C. at about 5 mbar and a density of 1.18 g/cm$^3$. The product is soluble in water and alcohols.

The two catalyst deactivators triglycerol and ditrimethylolpropane are added to the polymer in an amount of from about 0.001 to 1% by weight, based on the poisoner. The amount added depends on the amount of metallic catalyst residues still present in the polymer. Either only one of the two catalyst deactivators or a mixture of the two can be added to the polymer.

The catalyst deactivators are incorporated into the organic polymers by generally conventional methods.

For example, the incorporation can be effected by mixing or applying the compounds and, if desired, further additives into or onto the polymer directly after the polymerization or into the melt before or during molding. The incorporation can also take place by applying the dissolved or dispersed compounds onto the polymer directly or mixing into a solution, suspension or emulsion of the polymer, if necessary with subsequent evaporation of the solvent. The compounds are also effective if subsequently incorporated into a pre-granulated polymer in a separate processing step.

The compounds to be used according to the invention can also be added to the polymers to be stabilized in the form of a masterbatch which contains these compounds, for example, in a concentration of from 1 to 75% by weight, preferably from 2.5 to 30% by weight.

In addition, the organic polymers to be stabilized may also contain the following antioxidants, such as, for example:

1. Alkylated monophenols, for example
    2,6-di-t-butyl-4-methylphenol,
    2-t-butyl-4,6-diemthylphenol,
    2,6-di-t-butyl-4-ethylphenol,
    2,6-di-t-butyl-4-n-butylphenol,
    2,6-di-t-butyl-4-i-butylphenol,
    2,6-dicyclopentyl-4-methylphenol,
    2-(α-methylcyclohexyl)-4,6-dimethylphenol,
    2,6-dioctadecyl-4-methylphenol,
    2,4,6-tricyclohexylphenol and
    2,6-di-t-butyl-4-methoxymethylphenol.
2. Alkylated hydroquinones, for example
    2,6-di-t-butyl-4-methoxyphenol,
    2,5-di-t-butylhydroquinone,
    2,5-di-t-amylhydroquinone and
    2,6-diphenyl-4-octadecyloxyphenol.
3. Hydroxylated diphenyl thioethers, for example
    2,2'-thiobis(6-t-butyl-4-methylphenol),
    2,2'-thiobis(4-octylphenol),
    4,4'-thiobis(6-t-butyl-3-methylphenol) and
    4,4'-thiobis(6-t-butyl-2-methylphenol).
4. Alkylidenebisphenols, for example
    2,2'-methylenebis (6-t-butyl-4-methylphenol),
    2,2'-methylenebis (6-t-butyl-4-ethylphenol),
    2,2'-methylenebis [4-methyl-6- (α-methylcyclo -hexyl)phenol],
    2,2'-methylenebis(4-methyl-6-cyclohexylphenol),
    2,2'-methylenebis(6-nonyl-4-methylphenol),
    2,2'-methylenebis(4,6-di-t-butylphenol),
    2,2'-ethylidenebis(4,6-di-t-butylphenol),
    2,2'-ethylidenebis(6-t-butyl-4-isobutylphenol),
    2,2'-methylenebis[6-(α-methylbenzyl)-4-nonylphenol],
    2,2'-methylenebis[6-(α,α-dimethylbenzyl)-4-nonylphenol],
    4,4'-methylenebis(2,6-di-t-butylphenol),
    4,4'-methylenebis(6-t-butyl-2-methylphenol),
    1,1-bis(5-t-butyl-4-hydroxy-2-methylphenyl)butane,
    2,6-di-(3-t-butyl-5-methyl-2-hydroxybenzyl)-4-methylphenol,
    1,1,3-tris-(5-t-butyl-4-hydroxy-2-methyl -phenyl)butane,
    1,1-bis(5-t-butyl-4-hydroxy-2-methylphenyl)-3-n dodecylmercaptobutane,
    di(3-t-butyl-4-hydroxy-5-methylphenyl)dicyclopentadiene
    di[2-(3'-t-butyl-2'-hydroxy-5'-methylbenzyl)-6-t-butyl-4-methyl-phenyl]terephthalate and ethylene glycol bis[3,3-bis(3'-t-butyl-4'-hydroxy -phenyl)-]butyrate.
5. Benzyl compounds, for example
    1,3,5-tri (3,5-di-t-butyl-4-hydroxybenzyl) -2,4,6-trimethylbenzene
    di (3,5-di-t-butyl-4-hydroxybenzyl) sulfide, isooctyl 3,5-di-t-butyl-4-hydroxybenzylmercaptoacetate,
    bis(4-t-butyl-3-hydroxy-2,6-dimethylbenzyl) dithiol terephthalate,
    1,3 ,5-tris(3,5-di-t-butyl-4-hydroxybenzyl) isocyanurate,
    1,3,5 -tris(4-t-butyl-3-hydroxy-2,6-dimethylbenzyl) isocyanurate,
    dioctadecyl 3,5 -di -t -butyl - 4 -hydroxybenzylphosphonate and
    calcium salt of monoethyl 3,5-di-t-butyl-4-hydroxybenzylphosphonate.
6. Acylamino phenols, for example
    4-hydroxylauranilide,
    4-hydroxystearanilide,
    2,4-bisoctylmercapto-6-(3,5-di-t-butyl-4-hydroxy -anilino)-s-triazine,
    octyl N-(3,5-di-t-butyl-4-hydroxyphenyl)carbamate.
    Esters of β-(3,5-di-t-butyl-4-hydroxyphenyl) -propionic acid with monohydric or polyhydric alcohols, such as, for example, with

| methanol, | diethylene glycol, |
| octadecanol, | triethylene glycol, |
| 1,6-hexanediol, | pentaerythritol, |
| neopentyl glycol, | tris(hydroxyethyl)isocyanurate, |
| thiodiethylene glycol | di(hydroxyethyl)oxalamide. |

8. Esters of β-(5-t-butyl-4-hydroxy-3-methylphenyl) -propionic acid with monohydric or polyhydric alcohols, such as, for example, with

| methanol, | diethylene glycol, |
| octadecanol, | triethylene glycol, |
| 1,6-hexanediol, | pentaerythritol, |
| neopentyl glycol, | tris(hydroxyethyl)isocyanurate, |
| thiodiethylene glycol | di(hydroxyethyl)oxalamide. |

9. Amides of β-(3,5-di-t-butyl-4-hydroxyphenyl) -propionic acid, such as, for example,
    N,N'-di(3,5-di-t-butyl-4-hydroxyphenylpropionyl) -hexamethylenediamine,
    N,N'-di(3,5-di-t-butyl-4-hydroxyphenylpropionyl) -trimethylenediamine and
    N,N'-di(3,5-di-t-butyl-4-hydroxyphenylpropionyl) -hydrazine.

In addition, the polymers to be stabilized may also contain other additives, such as, for example:
1. UV adsorbers and light stabilizers
    1.1. 2-(2'-hydroxyphenyl) benzotriazoles, such as, for example, the 5'-methyl, 3', 5'-di-t-butyl, 5'-t-butyl, 5'- (1,1,3,3-tetramethylbutyl) , 5-chloro-3', 5'-di-t-butyl, 5-chloro-3'-t-butyl-5'-methyl, 3'-sec. -butyl-5'-t-butyl, 4'-octoxy, 3', 5'-di-t-amyl and 3', 5'-bis (α,α-dimethylbenzyl) derivatives.
    1.2. 2-hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.
    1.3 Esters of substituted or unsubstituted benzoic acids, for example 4-t-butylphenyl salicylate, phenyl salicylate, octylphenyl salicylate, dibenzoylresorcinol, bis(4-t-butylbenzoyl) resorcinol, benzoylresorcinol, 2,4-di-t-butylphenyl 3,5-di-t-butyl-4-hydroxy-benzoate and hexadecyl 3,5-di-t-butyl - 4 -hydroxy-benzoate.

1.4 Acrylates, for example ethyl and isooctyl α-cyano-β,β-diphenyl acrylate, methyl α-carbomethoxycinnamate, methyl and butyl α-cyano-β-methyl-p-methoxycinnamate, methyl α-carbomethoxy-p-methoxycinnamate and N-(β-carbomethoxy-9-cyanovinyl)-2-methyl indoline.

1.5 Nickel compounds, for example nickel complexes of 2,2'-thiobis[4-(1,1,3,3-tetramethylbutyl)phenol], such as the 1:1 and 1:2 complexes, if desired with additional ligands such as n-butylamine, triethanolamine or N-cyclohexyldiethanolamine, nickel alkyl dithiocarbamate, nickel salts of monoalkyl esters of 4-hydroxy-3,5-di-t-butylbenzylphosphonic acid, such as the methyl and ethyl esters, nickel complexes of ketoximes, such as of 2-hydroxy-4-methylphenylundecyl ketoxime, nickel complexes of 1-phenyl-4-lauroyl -5-hydroxypyrazole, if desired with additional ligands, and nickel salts of 2-hydroxy-4-alkoxybenzophenones.

1.6 Stearically hindered amines, for example 1.6.1. bis (2,2,6,6-tetramethylpiperidyl) sebacate, bis(1,2,2,6,6-pentamethylpiperidyl) sebacate, bis(2,2,6,6 -tetramethylpiperidyl) glutarate, bis(1,2,2,6,6 -pentamethylpiperidyl) glutarate, bis(2,2,6,6-tetramethylpiperidyl) succinate, bis(1,2,2,6,6-pentamethylpiperidyl) succinate, 4-stearyloxy-2,2,6,6-tetramethylpiperidine, 4 -stearyloxy- 1,2,2,6,6 -pentamethylpiperidine, 4-stearoyloxy-2,2,6,6-tetraunethylpiperidine, 4-stearoyloxy-1,2,2,6,6-pentamethylpiperidine, 2,2,6,6-tetramethylpiperidyl behenate, 1,2,2,6,6-pentamethylpiperidyl behenate, 2,2,4,4-tetramethyl-7-oxa-3 , 20-diazadispiro -[5.1.11.2 ]heneicosan-21-one, 2,2,3,4,4-pentamethyl-7-oxa-3,20-diazadispiro -[5.1.11.2 ]heneicosan-21-one, 2,2,4,4-tetramethyl-3-acetyl-7-oxa-3,20-diaza-dispiro [5.1.11.2 ]heneicosan-21-one, 2,2,4,4-tetramethyl-7-oxa-3 , 20-diaza-20- (β-lauryloxycarbonylethyl) -21-oxodispiro [5.1.11.2 ]-heneicosane, 2,2,3,4,4-pentamethyl-7-oxa-3,20-diaza-20- (β-lauryloxycarbonylethyl) -21-oxodispiro-[5.1.11.2 ]heneicosane, 2,2,4,4-tetramethyl-3-acetyl-7-oxa-3,20-diaza-20-(β-lauryloxycarbonylethyl) -21-oxodispiro-[5.1.11.2 ]heneicosane, 1,1'-3,3',5,5'-hexahydro-2,2', 4,4', 6,6'-hexa-aza-2,2',6,6'-bismethano-7,8-dioxo-4,4'-bis-(1,2,2,6,6-pentamethyl-4-piperidyl) biphenyl, N,N',N'',N'''-tetrakis[2,4-bis[N-(2,2,6,6-tetra -methyl-4-piperidyl)butylamino]-1,3,5-triazin-6-yl]-4,7-diazadecane-1,10-diamine, N,N',N'',N'''-tetrakis[2,4-bis[N(1,2,2,6,6-penta -methyl-4-piperidyl)butylamino]-1,3,5-triazin-6-yl]-4,7-diazadecane-1,10-diamine, N,N',N'',N'''-tetrakis[2,4-bis[N(2,2,6,6-tetra -methyl-4-piperidyl)methoxypropylamino]-1,3,5-triazin-6-yl]-4,7-diazadecane-1, 10-diamine, N,N',N'',N'''-tetrakis[2,4-bis[N(1,2,2,6,6-penta -methyl-4-piperidyl)methoxypropylamino]-1,3,5-triazin-6-yl]-4,7-diazadecane-1,10-diamine, bis(1,2,2,6,6-pentamethylpiperidyl)-n-butyl-3,5-di-t-butyl-4-hydroxybenzyl malonate, tris(2,2,6,6-tetramethyl-4-piperidyl) nitrilotriacetate, tetrakis(2,2,6,6-tetramethyl-4-piperidyl) -1,2,3,4-butanetetracarboxylic acid and 1,1'-(1,2-ethanediyl)bis(3,3,5,5-tetramethyl -piperazinone).

1.6.2 . Poly-N,N'-bis (2,2,6,6 -tetramethyl-4-piperidyl) -1,8 -diazadecylene, the product of the condensation of 1- (2-hydroxyethyl) -2,2,6,6-tetramethyl-4-hydroxypiperidine and succinic acid, the product of the condensation of N,N'-bis (2,2,6,6-tetramethyl-4-piperidyl) -hexamethylenediamine and 4-t-octylamino-2,6-dichloro-1,3,5-triazine, and the product of the condensation of N,N'-bis(2,2,6,6-tetramethyl-4-piperidyl) hexamethylenediamine and 4-morpholino -2,6-dichloro-1,3,5-triazine.

1.7. Oxalic acid diamides for example 4,4'-dioctyl -oxyoxanilide, 2,2'-dioctyloxy-5,5'-di-t-butyl -oxanilide, 2,2'-didodecyloxy-5,5'-di-t-butyl -oxanilide, 2-ethoxy-2'-ethyloxanilide, N,N'-bis(3-dimethylaminopropyl)oxalamide, 2-ethoxy-5-t-butyl-2'-ethyloxanilide and the mixture thereof with 2-ethoxy-2'-ethyl-5,4-di-t-butyloxanllide, and mixtures of o- and p-methoxy- and o- and p-ethoxy-disubstiuted oxanilide.

2. Metal deactivators, for example N,N'-diphenyl -oxalamide, N-salicylyl-N'-salicyloyl-hydrazine, N,N'-bissalicyloyl-hydrazine, N,N'-bis-(3,5-di -t-butyl- 4 -hydroxyphenylpropionyl)hydrazine, 3-salicyloylamino-1,2,3-triazole and bisbenzylideneoxalodihydrazide.

3. Phosphites and phosphonites, for example triphenyl phosphite, diphenyl alkyl phosphites, phenyl dialkyl phosphites, trisnonylphenyl phosphite, trilauryl phosphite, trioctadecyl phosphite, distearyl pentaerythrityl diphosphite, tris(2,4-di-t-butylphenyl) phosphite, diisodecyl pentaerythrityl diphosphite, bis(2,4-di-t-butyl -phenyl) pentaerythrityl diphosphite, tristearyl sorbityl triphosphite, tetrakis(2,4-di-t-butyl -phenyl)-4,4'-biphenylene diphosphonite, 3,9-bis(2,4-di-t-butylphenoxy)-2,4,8,10-tetraoxa -3,9-diphosphaspiro[5.5]undecane and tris(2-t -butyl-4-thio(2'-methenyl-4'-hydroxy-5'-t-butyl) -phenyl-5-methenyl)phenyl phosphite.

4. Peroxide-destroying compounds, for example esters of β-thiodipropionic acid, such as, for example, the lauryl, stearyl, myristyl and tridecyl esters, mercaptobenzimidazole, the zinc salt of 2-mercaptobenzimidazole, zinc alkyl dithiocar -bamates, dioctadecyl sulfide, dioctadecyl disulfide and pentaerythritol tetrakis(β-dodecylmercapto)propionate.

5. Basic costabilizers, for example melamine, polyvinylpyrrolidone, dicyandiamide, triallyl cyanurate, urea derivatives, hydrazine derivatives, amines, polyamines, polyurethanes, alkali metal and alkaline earth metal salts of higher fatty acids or phenoxides, for example calcium stearate, zinc stearate, magnesium stearate, sodium ricinoleate, potassium palmitate, antimony pyrocatecholate or zinc pyrocatecholate, and hydroxides and oxides of alkaline earth metals or of aluminum, for example CaO, MgO and ZnO.

6. Nucleating agents, for example 4-t-butyl-benzoic acid, adipic acid, diphenylacetic acid and dibenzylidenesorbitol.

7. Fillers and reinforcing agents, for example calcium carbonate, silicates, glass fibers, asbestos, talc, kaolin, mica, barium sulfate, metal oxides, metal hydroxides, carbon black and graphite.

8. Other additives, for example plasticizers, lubricants, emulsifiers, pigments, optical brighteners, flameproofing agents, antistatics and blowing agents.

The various additional additives of groups 1 to 6 mentioned above are added to the polymers to be stabilized in an amount of from 0.01 to 10% by weight, preferably from 0.01 to 5% by weight, based on the total weight of the molding composition. The proportion of the additives from groups 7 and 8 is from 1 to 80% by weight, preferably from 10 to 50% by weight, based on the total molding composition.

The organic polymers stabilized according to the invention can be used in various forms, for example as films, fibers, tapes, profiles, as coating compositions or as binders for surface coatings, adhesives or putties.

In particular, ditrimethylpropane ("di-TMP"), in addition to an excellent activity as a catalyst deactivator, also has the advantage of a virtually ideal melting behavior, having a melting point of 108°–111° C. This physical property enables ideal handling of di-TMP, whether during storage, metering or mixing with the polymer into which it is to be introduced. On the one hand, the melting point is sufficiently high that no problems, such as baking together or clumping, occur on storage, and di-TMP in the form of a powder can be easily metered into the polymer and mixed therewith. (Precise metering and homogeneous mixing of viscous liquids, such as, for example, glycerol or polyethylene glycol 400, cause considerable difficulties).

On the other hand, the melting point of 108 −111° C. is sufficiently low that homogeneous distribution in the molten polymer (during processing) is ensured (homogeneous distribution of, for example, tripenta -erythritol, having a melting point of 245° C., in polyethylene is not guaranteed even at processing temperatures of about 200° C.).

The examples below are intended to illustrate the subject-matter of the invention. The triglycerol used was a technical-grade product containing more than 80% by weight of triglycerol.

EXAMPLE 1

500 g of polypropylene (density about 0.88 g/cm$^3$ at 20° C., melting point about 158° C., viscosity about 1,500 mPa.s at 170° C.) were melted at 160° C. and then mixed with 2.5 g (2,13 mmol) of pentaerythrityl tetrakis[3-(3,5-di-t -butyl-4-hydroxyphenyl)propionate] (antioxidant 1) (phenolic antioxidant), and the mixture was then stirred at 160° C. for 15 minutes. 2.5 cm$^3$ (0.5 mmol) of triethyl -aluminum (solution in Esso Varsol) were then added, and the mixture was stirred at 160° C. for a further 15 minutes. The addition of triethylaluminum simulated the presence of metallic catalyst residues (aluminum compounds are a constituent of Ziegler-Natta polymerization catalysts).

An intensely red-violet polypropylene was obtained. In each case, 100 g of this (containing 1.0 mmol of Et$_3$Al) were heated to 200° C. under an N$_2$ atmosphere, and sufficient of the catalyst deactivator to be investigated was added in portions until no further change in the color of the polypropylene occurred even after stirring for a relatively long time at 200° C. Table 1 shows the "final color" of the polypropylene and the amount of the respective compound investigated which was added to achieve the "final color".

TABLE 1

| Added compound | Amount [mg] | Amount [mmol] | "Final color" |
| --- | --- | --- | --- |
| Glycerol | 108 | 1.17 | beige |
| Polyethylene | 250 | 0.63 | beige-brown |

TABLE 1-continued

| Added compound | Amount [mg] | Amount [mmol] | "Final color" |
| --- | --- | --- | --- |
| glycol 400 | | | |
| Tripentaerythritol | 300 | 0.81 | beige-brown |
| Ditrimethylolpropane | 124 | 0.49 | pale beige |
| Triglycerol | 70 | 0.29 | white |

EXAMPLE 2

Example 1 was repeated, but the phenolic antioxidant added was 2.5 g (3.14 mmol) of glycol bis[3,3-bis(4'-hydroxy-3'-t-butylphenyl)butanoate](antioxidant 2). A violet polypropylene was obtained.

TABLE 2

| Added compound | Amount [mg] | Amount [mmol] | "Final color" |
| --- | --- | --- | --- |
| Glycerol | 275 | 2.99 | beige-pink |
| Polyethylene glycol 400 | 600 | 1.50 | pale violet |
| Tripentaerythritol | 450 | 1.21 | pale pink |
| Ditrimethylolpropane | 125 | 0.50 | beige-yellow |
| Triglycerol | 350 | 1.46 | beige-yellow |

EXAMPLE 3

Example 1 was repeated, but the 2.5 cm$^3$ of triethyl-aluminum solution were replaced by 0.6 cm$^3$ (5.47 mmol) of titanium (IV) chloride (titanium compounds are present in Ziegler-Natta catalysts). Using this (together with the phenolic antioxidants), a red-brown polypropylene was obtained.

TABLE 3

| Added compound | Amount [mg] | Amount [mmol] | "Final color" |
| --- | --- | --- | --- |
| Glycerol | 150 | 1.63 | pale orange |
| Polyethylene glycol 400 | 80 | 0.20 | orange-brown |
| Tripentaerythritol | 250 | 0.67 | orange-brown |
| Ditrimethylolpropane | 248 | 1.00 | beige-orange |
| Trigylcerol | 420 | 1.75 | pale yellow |

EXAMPLE 4

Example 3 was repeated, but the phenolic antioxidant added was 2.5 g (3.14 mmol) of glycol bis[3,3-bis(4'-hydroxy-3'-t-butylphenyl)butanoate]. A red-brown polypropylene was obtained.

TABLE 4

| Added compound | Amount [mg] | Amount [mmol] | "Final color" |
| --- | --- | --- | --- |
| Glycerol | 130 | 1.41 | yellow-orange |
| Polyethylene glycol 400 | 60 | 0.15 | dark orange |
| Tripentaerythritol | 200 | 0.54 | orange-brown |
| Ditrimethylolpropane | 310 | 1.24 | pale yellow |
| Trigylcerol | 420 | 1.75 | yellow |

EXAMPLE 5

0.1 part of calcium stearate and x parts of additive were added to 100 parts of polyethylene (density 0.955 g/cm$^3$ at 23° C.; MFI 190/5=0.28 g/10 min; MFI 190/21.6=9 g/10 min unstabilized).

The mixtures were kneaded for 10 minutes in an open laboratory compounder at 200° C. and 20 rpm. A 1 mm pressed sheet was subsequently produced from the sample material at 180° C., and the yellowness index thereof was measured.

TABLE 5

| Additives | Yellowness index |
|---|---|
| 0.2 part of antioxidant 2 | 38.3 |
| 0.2 part of antioxidant 1 | 14.4 |
| 0.2 part of antioxidant 1 + 0.02 part of ditrimethylolpropane | 5.8 |
| 0.2 part of antioxidant 2 + 0.02 part of ditrimethylolpropane | 4.6 |

EXAMPLE 6

Example 5 was repeated, only this time the effect in various polymers was investigated.

TABLE 6

(Polymer = LLD polyethylene)

| Additives | Yellowness index (density 0.92 g/cm$^3$ at 23° C.; MFI 190/2 = 10 g/10 min) |
|---|---|
| 0.2 part of antioxidant 2 | 12.3 |
| 0.19 part of antioxidant 2 + 0.01 part of ditrimethylolpropane | 2.2 |
| 0.19 part of antioxidant 2 + 0.01 part of glycerol | 2.3 |

TABLE 7

(Polymer = polyethylene as in Example 5)

| Additives | Yellowness index |
|---|---|
| 0.2 part of antioxidant 2 | 38.3 |
| 0.19 part of antioxidant 2 + 0.01 part of ditrimethylolpropane | 8.6 |
| 0.19 part of antioxidant 2 + 0.01 part of glycerol | 20.7 |

TABLE 8

(Polymer = polypropylene)

| Additives | Yellowness index (density 90 g/cm$^3$ at 23° C.; MFI 230/2 = 0.5 g/10 min) |
|---|---|
| 0.2 part of antioxidant 2 | 38.3 |
| 0.10 part of antioxidant 2 + 0.01 part of ditrimethylolpropane | 0.6 |
| 0.19 part of antioxidant 2 + 0.01 part of glycerol | 3.2 |

EXAMPLE 7

Discoloration of Various Phenolic Antioxidants 100 parts of polyethylene as in Example 5 were mixed with 0.1 part of calcium stearate and x parts of additive, and the mixture was subjected to repeated granulation (laboratory extruder, T=200°/250°/300° C.). After each granulation operation, the yellowness index was measured on the granules.

TABLE 9

| Additive | Yellowness index after Granulation | | | | |
|---|---|---|---|---|---|
| | 1x | 2x | 3x | 4x | 5x |
| 0.2 part of antioxidant 2 | 42.4 | 42.4 | 42.6 | 43.2 | 43.3 |
| 0.2 part of antioxidant 2 + 0.02 part of ditrimethylolpropane | 12.7 | 13.1 | 15.1 | 17.1 | 17.6 |
| 0.2 part of antioxidant 1 | 30.7 | 32.5 | 33.1 | 33.7 | 34.2 |
| 0.2 part of antioxidant 1 + 0.02 part of ditrimethylolpropane | 10.2 | 12.9 | 14.9 | 15.8 | 17.1 |
| 0.2 part of antioxidant 3*) 0.02 part of ditrimethylolpropane | 30.5 | 30.3 | 31.7 | 33.5 | 34.2 |
| 0.2 part of antioxidant 3 + 0.02 part of ditrimethylolpropane | 10.6 | 13.1 | 15.3 | 16.2 | 17.2 |

*) Antioxidant 3 = octadecyl 3-(3,5-di-t-butyl-4-hydroxyphenyl)propionate

We claim:

1. A process for reducing the discoloration of a plastic molding composition which contains a phenolic compound as stabilizer and heavy-metal ions as catalysts residues, which comprises adding at the processing temperature from 0.001 to 1% by weight, based on the polymer, of ditrimethylolpropane to the molding composition wherein said polymer is polyethylene or polypropylene or mixture thereof.

2. The composition as claimed in claim 1, further comprising an antioxidant.

3. The composition as claimed in claim 2, wherein said antioxidant is selected from the group consisting of
   A) alkylated monophenols,
   B) alkylated hydroquinones,
   C) hydroxylated diphenyl thioethers,
   D) alkylidenebisphenols,
   E) benzyl compounds,
   F) acylamino phenols,
   G) ester of β-(3,5-di-t-butyl-4-hydroxyphenyl)-propionic acid with monohydric or polyhydric alcohols,
   H) ester of β-(5t-butyl-4-hydroxy-3-methylphenyl)-propionic acid with monohydric or polyhydric alcohols and
   I) amides of β-(3,5-di-t-butyl-4- hydroxyphenyl)-propionic acid.

4. The process as claimed in claim 1, wherein there is 0.001 to 0.13% by weight based on the polymer, ditrimethylolpropane to the molding composition.

5. A method for deactivating a catalyst residue in a molded organic polymer consisting of the step of adding ditrimethylolpropane to a molding composition which contains the organic polymer during the molding of said molding composition.

6. A method as claimed in claim 5, wherein a said catalyst residue contains heavy-metal ions.

* * * * *